US012742537B2

(12) United States Patent
Clohosey et al.

(10) Patent No.: US 12,742,537 B2
(45) Date of Patent: Sep. 22, 2026

(54) BOX-SHAPED LIGHT FIXTURE WITH DIFFUSER LENS HAVING A PLURALITY OF DIFFRACTIVE RIBS

(71) Applicant: MaxLite Inc., Pine Brook, NJ (US)

(72) Inventors: Eric Clohosey, East Rutherford, NJ (US); Stephen Andrew Entrekin, Chester, NJ (US)

(73) Assignee: MAXLITE, INC, Pine Brook, NJ (US)

( * ) Notice: Subject to any disclaimer, the term of this patent is extended or adjusted under 35 U.S.C. 154(b) by 0 days.

(21) Appl. No.: 19/192,876

(22) Filed: Apr. 29, 2025

(65) Prior Publication Data

US 2025/0354676 A1 Nov. 20, 2025

Related U.S. Application Data

(60) Provisional application No. 63/649,343, filed on May 18, 2024.

(51) Int. Cl.

| | |
|---|---|
| ***F21V 13/04*** | (2006.01) |
| ***F21S 9/02*** | (2006.01) |
| ***F21V 5/04*** | (2006.01) |
| ***F21V 7/24*** | (2018.01) |
| ***F21V 15/01*** | (2006.01) |
| ***F21V 17/06*** | (2006.01) |

(Continued)

(52) U.S. Cl.

CPC ................ *F21V 13/04* (2013.01); *F21S 9/02* (2013.01); *F21V 5/04* (2013.01); *F21V 7/24* (2018.02); *F21V 15/01* (2013.01); *F21V 17/06* (2013.01); *H05B 45/10* (2020.01); *H05B 45/20* (2020.01); *H05B 47/155* (2020.01); *H05B 47/17* (2020.01); *F21Y 2115/10* (2016.08)

(58) Field of Classification Search

CPC . F21V 5/007; F21V 5/02; F21V 5/045; F21V 23/003; F21V 13/04; F21V 7/24; F21V 15/01; F21Y 2105/16; F21Y 2105/12; F21Y 2105/10

See application file for complete search history.

(56) References Cited

U.S. PATENT DOCUMENTS 8,573,809 B2 * 11/2013 Nakamura .............. F21V 5/007 362/249.02
8,841,834 B2 * 9/2014 Pickard ..................... F21V 5/10 362/228

(Continued)

*Primary Examiner* — Ismael Negron
(74) *Attorney, Agent, or Firm* — Budzyn IP Law, LLC

(57) ABSTRACT

A canopy light fixture including a housing with a base panel and a plurality of side panels extending from the base panel, arranged to define a cavity and a an opening; a diffuser lens configured to cover the opening, and having a plurality of concentric, diffractive ribs, at least one of the diffractive ribs having a rib width smaller than a rib width of an immediately adjacent diffractive rib, such that the at least one of the diffractive ribs diffracts transmitted light at a beam angle distinct from a beam angle of light transmitted by the immediately adjacent diffractive rib; a circuit board positioned within the interior cavity, carrying discrete groups of solid-state lighting elements aligned with a corresponding diffractive rib; a reflective member; and an electronic control module configured to independently activate each group of solid-state lighting elements to adjust both light beam angles and correlated color temperatures.

10 Claims, 4 Drawing Sheets

(51) Int. Cl.

| | |
|---|---|
| ***H05B 45/10*** | (2020.01) |
| ***H05B 45/20*** | (2020.01) |
| ***H05B 47/155*** | (2020.01) |
| ***H05B 47/17*** | (2020.01) |
| *F21Y 115/10* | (2016.01) |

(56) References Cited

U.S. PATENT DOCUMENTS

| | | | | |
|---|---|---|---|---|
| 9,797,585 | B2 * | 10/2017 | Leshniak ................ | F21V 5/007 |
| 9,810,403 | B2 * | 11/2017 | Wang ...................... | F21V 5/045 |
| 10,477,639 | B2 * | 11/2019 | Pilat ........................ | F21V 5/007 |
| 10,683,987 | B2 * | 6/2020 | Kishikawa .............. | F21V 5/007 |
| 10,914,452 | B2 * | 2/2021 | Zou ......................... | F21V 5/007 |
| 10,982,835 | B2 * | 4/2021 | Shima ..................... | F21V 5/007 |
| 11,118,755 | B2 * | 9/2021 | Hong ........................ | F21V 5/04 |
| 11,774,060 | B2 * | 10/2023 | Eilertsen ................. | F21V 5/007<br>362/235 |
| 11,933,476 | B2 * | 3/2024 | Lim ......................... | F21V 5/045 |
| 2013/0265752 | A1 * | 10/2013 | Shimizu .................. | F21V 5/007<br>362/330 |
| 2018/0245771 | A1 * | 8/2018 | Liu ......................... | F21V 5/007 |

* cited by examiner

BOX-SHAPED LIGHT FIXTURE WITH DIFFUSER LENS HAVING A PLURALITY OF DIFFRACTIVE RIBS

CROSS-REFERENCE TO RELATED APPLICATION(S)

The present disclosure is related to, and claims priority to, U.S. Provisional Patent Application Ser. No. 63/649,343, titled "SOLID-STATE CANOPY LIGHT FIXTURE WITH ADJUSTABLE LIGHT SETTINGS," which was filed on May 18, 2024, the entirety of which is incorporated by reference into the present disclosure.

BACKGROUND

Canopy light fixtures are well known in the prior art. Typically, canopy light fixtures are horizontally mounted, commonly ceiling mounted, to have downward light throw. As such, these light fixtures are well-suited for area lighting and safety lighting, for example, in parking structures, gas stations, buildings, walkways and entryways.

A typical canopy light fixture includes a box-shaped housing to which is mounted a diffuser lens. Installation of the fixture requires physical mounting of the housing with electrical wiring being pulled through one or more access openings in the housing, e.g., through one or more knockout holes. The diffuser lens may be removed with standard designs to alter the generated light pattern. Removal and re-mounting of the diffuser lens is time consuming, particularly in large installations where a large quantity of canopy light fixtures is required to be installed.

SUMMARY

A solid-state canopy light fixture is provided herein having independently controllable sets (and subsets) of solid-state light generating elements to alter light patterns particularly to generate different light temperatures and different light beam angles. As recognized in the lighting industry, solid-state lighting may be rated based on CCT (correlated color temperature). The subject invention allows for CCT adjustment. In addition, the subject invention allows for light beams of different beam angles which allow for different areas of lighting (ranging from narrower to broader light beam angles). The subject invention allows for alteration of these light settings without physical retrofit of the light fixture.

DETAILED DESCRIPTION

In the field of lighting, particularly in environments such as parking structures, gas stations, and walkways, canopy light fixtures are widely used due to their ability to provide broad area illumination. These fixtures are typically mounted horizontally, often on ceilings, to direct light downward. However, traditional canopy light fixtures present several challenges. The installation process can be cumbersome, requiring physical mounting of the housing and threading electrical wiring through access openings. Additionally, altering the light pattern often necessitates the removal and reinstallation of the diffuser lens, which is time-consuming, especially in large-scale installations.

Canopy light fixtures that have been previously developed generally employ a fixed configuration for light distribution, limiting their adaptability to different lighting needs. The inability to adjust light beam angles or color temperatures without physical modification of the fixture is a significant drawback. This inflexibility can lead to inefficient lighting, as the fixtures cannot be easily tailored to suit varying environmental conditions or user preferences.

The present technology addresses these limitations by introducing a solid-state canopy light fixture with independently controllable sets of solid-state lighting elements. This innovative design allows for the adjustment of light patterns, including different correlated color temperatures (CCT) and beam angles, without the need for physical alterations to the fixture. By enabling electronic control over these parameters, the technology provides a versatile lighting solution that can be customized to meet diverse requirements, enhancing both functionality and user convenience.

Figure 2:
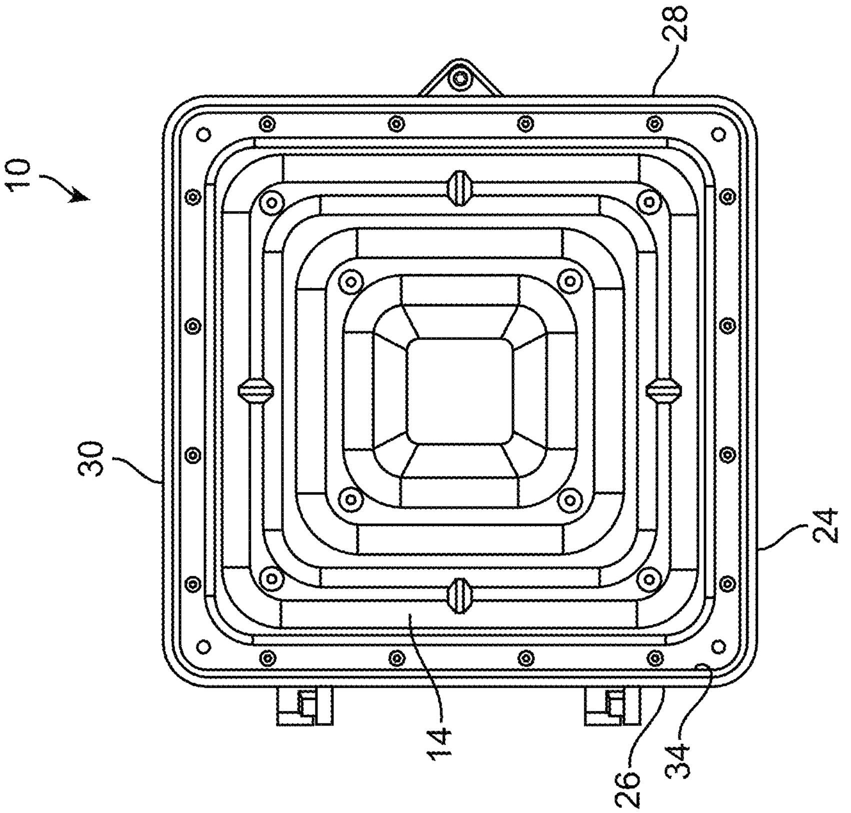
FIG. 2 is a top view illustrating the arrangement of the diffuser lens and housing in the solid-state canopy light fixture.
Figure 4:
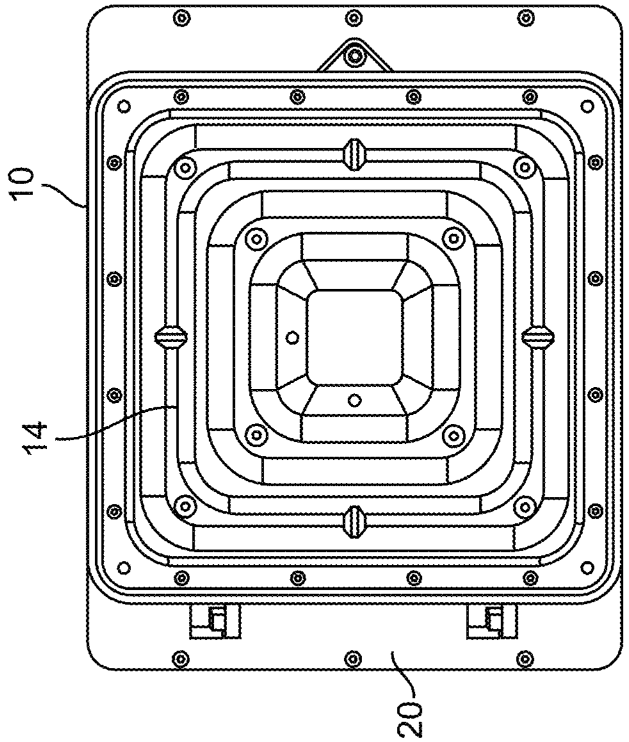
FIG. 4 is a top view illustrating the solid-state canopy light fixture's housing, diffuser lens, and backup battery configuration.
Figure 3:
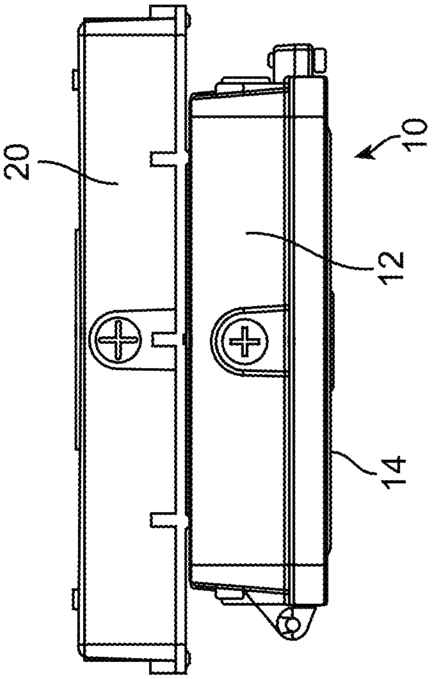
FIG. 3 is a side view illustrating the solid-state canopy light fixture's housing and diffuser lens configuration, and backup battery configuration.

With reference to FIGS. 1-4, a solid-state light fixture is shown and generally designated with reference number 10. The light fixture 10 generally includes a housing 12, a diffuser lens 14, and at least one board 16 containing a plurality of solid-state lighting elements. As shown in FIGS. 3-4, the light fixture 10 may include a back-up battery 20, as known in the art.

The housing 12 is preferably box-shaped with a base panel 22, a first side panel 24, a second side panel 26, a third side panel 28, and a fourth side panel 30. The first, second, third, and fourth side panels, 24, 26, 28, 30 perimetrically bound the base panel 22 such that the base panel 22 and the first, second, third, and fourth side panels, 24, 26, 28, 30 collectively define an interior volume 32. In addition, the first, second, third, and fourth side panels, 24, 26, 28, 30 define a top opening 34, spaced from the base panel 22, through which the interior volume 32 is accessible.

The housing 12 may be formed of polymeric material, such as plastic, and be formed by molding, such by injection molding. Alternatively, the housing 12 may be formed partially or wholly of metallic material, e.g., aluminum, and may be die cast. The first, second, third, and fourth side panels, 24, 26, 28, 30 may be joined to form a continuous wall about the base panel 22.

Figure 6:
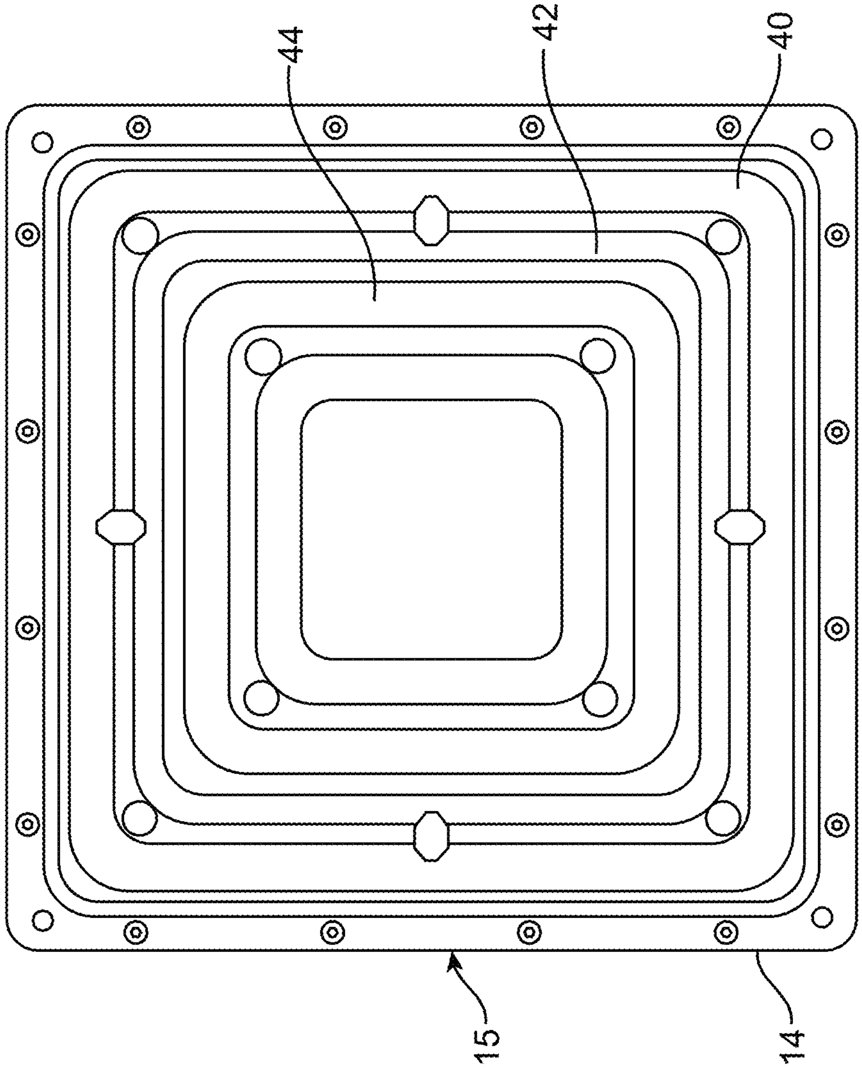
FIG. 6 illustrates a top view of the diffuser lens with concentric ribs for altering light beam angles.
Figure 7:
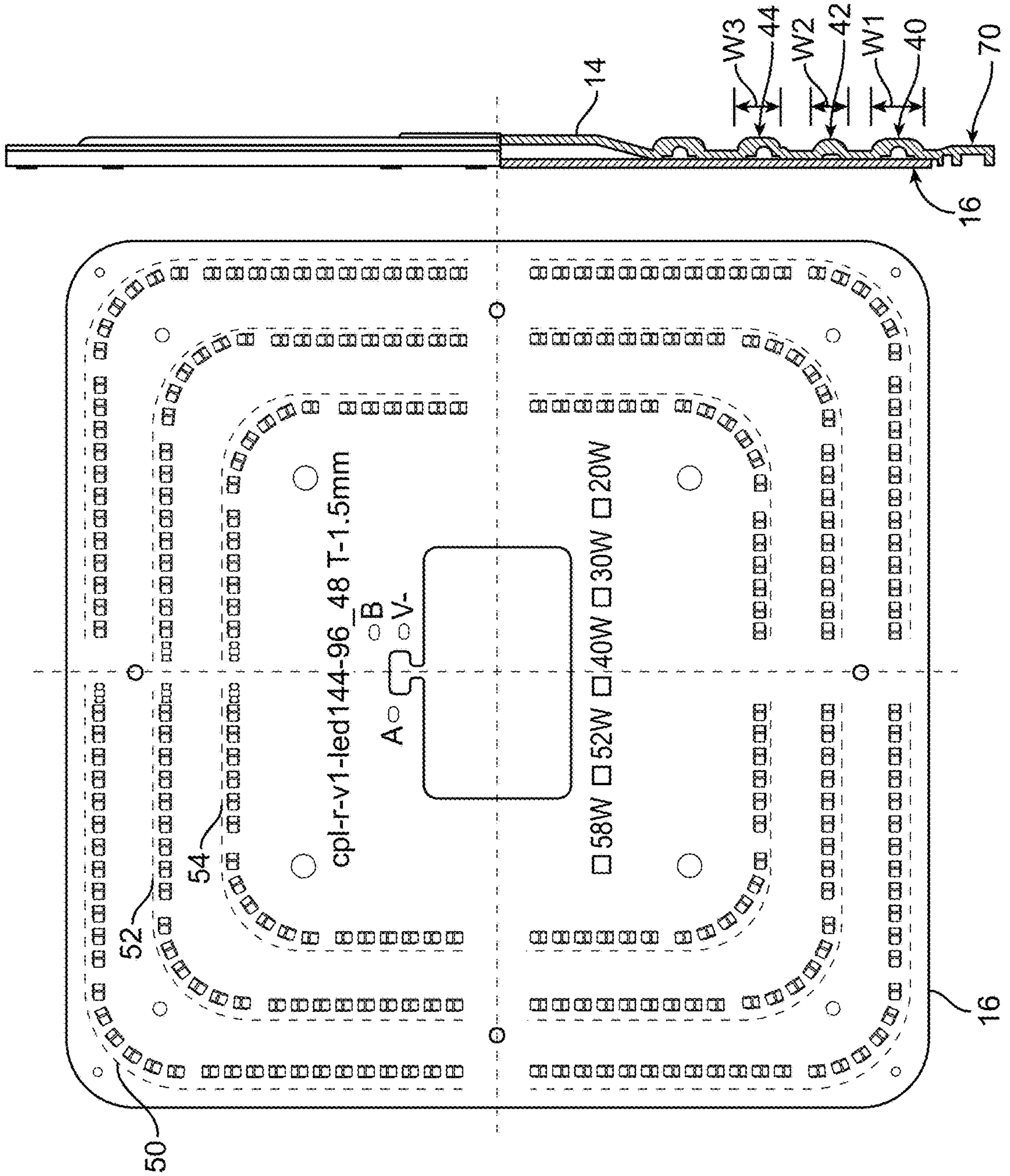
FIG. 7 is a schematic diagram illustrating the arrangement of solid-state lighting elements and their alignment with the diffractive ribs in the light fixture.

The diffuser lens 14 may be of any form known in the art, preferably being translucent. The diffuser lens 14 is secured to the housing 12 in any known manner. The diffuser lens 14 includes an outer perimeter 15 generally matched to the shape of the top opening 34. As shown in FIGS. 6-7, first, second, and third concentric ribs 40, 42, 44 are formed in the diffuser lens 14 which protrude in a direction away from the interior volume 32. The first, second, third ribs 40, 42, 44 are configured to diffract light transmitted therethrough.

Preferably, as shown in FIG. 7, the first rib 40 has a first width W1, the second rib 42 has a second width W2, and the third rib 44 has a third width W3. To allow for changes in beam angle, the ribs may diffract light to different extents. This may be achieved, for example, with the second width W2 being less than both the first width W1 and the third width W3. In addition, the first width W1 and the third width W3 may be equal. As will be appreciated by those skilled in the art, the widths may be altered as needed, e.g., with all three widths being different. In addition, the widths may be arranged in different concentricity, e.g., with the narrowest width being outermost. A fourth and further additional ribs may be also utilized.

As shown in FIG. 7, the maximum height of each of the first rib 40, second rib 42, and third rib 44 may be generally equal (as measured from the at least one board 16). As will be appreciated by those skilled in the art, the heights of the ribs may be varied. In addition, the cross-sectional shapes of the ribs may be varied, e.g., having more or less curvature, flattened surfaces, and so forth.

The at least one board 16 may be one or more circuit boards of any known type, including printed circuit boards (PCB's). The solid-state lighting elements are mounted to the at least one board 16 in any known manner so as to be ready for activation by application of electrical power to inputs on the at least one board 16. Any related wiring may be contained within the board 16 as is known in the art.

The at least one board 16 contains first, second, and third sets of the solid-state lighting elements 50, 52, 54, wherein: the first set of solid-state lighting elements 50 are arranged along, and in alignment with, the first rib 40; the second set of solid-state lighting elements 52 are arranged along, and in alignment with, the second rib 42; and, the third set of solid-state lighting elements 54 are arranged along, and in alignment with, the third rib 44.

The first, second, and third sets of the solid-state lighting elements 50, 52, 54 are independently controllable. This allows light to be generated in different combinations in alignment with the first, second, and third ribs 40, 42, 44. This allows for different light beam angles to be achieved. For example, light generated only by the second set 52 and transmitted through the second rib 42 may provide a first beam angle, which is less than light generated by the first set 50 and transmitted through the first rib 40. The first, second, and third sets 50, 52, 54 may be activated in different combinations to allow for further light beam angles to be generated.

In addition, subsets of each of the first, second and third sets of the solid-state lighting elements 50, 52, 54 may be independently controllable thereby allowing for CCT control. Thus, through a particular rib, the amount of light being transmitted may be controlled with the physical structure of the rib diffracting the transmitted light.

The solid-state lighting elements may be any type of solid-state lighting elements, such as light emitting diodes (LED's), organic light emitting diodes (OLED's), and polymer light emitting diodes (PLED's).

The at least one board 16 is located adjacent the diffuser lens 14. The at least one board 16 is situated to direct light generated by the solid-state lighting elements at the diffuser lens 14. In addition, and optionally, a reflector 70 may be provided on the at least one board 16 which surrounds each of the solid-state lighting elements. The reflector 70 may be a sheet and may be formed of polymeric material, such as PET (polyethylene terephthalate).

With the light fixture 10 being useable in outdoor or non-climate-controlled environments, one or more seals may be provided to inhibit the ingress of moisture into the interior volume 32, particularly about any points of ingress into the interior volume 32.

Figure 1:
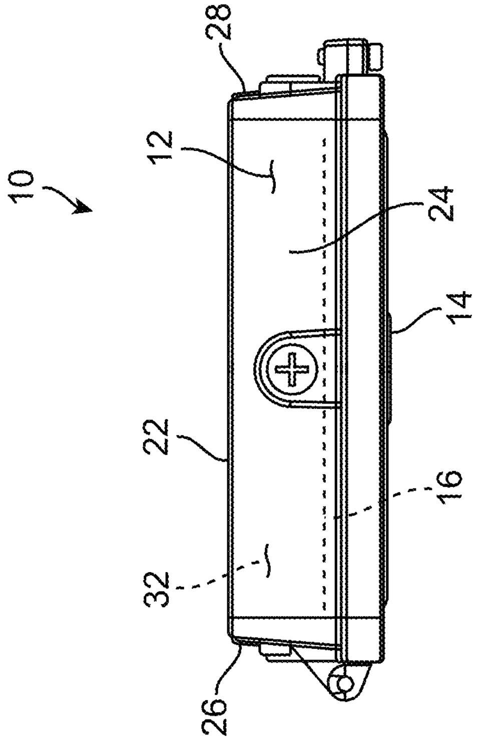
FIG. 1 is a schematic diagram illustrating the solid-state canopy light fixture's housing and diffuser lens configuration.

FIG. 1 shows a solid-state canopy light fixture 10, which includes a housing 12, a diffuser lens 14, a board 16, a base panel 22, a first side panel (FSP) 24, a second side panel (SSP) 26, a third side panel (TSP) 28, and an interior volume 32. The light fixture 10 is designed to provide adjustable lighting settings, enhancing the functionality of the fixture in various environments.

The housing 12 is box-shaped and comprises the base panel 22, first side panel 24, second side panel 26, and third side panel 28. These panels collectively define the interior volume 32, which is accessible through a top opening 34. The housing 12 serves as the structural framework for the light fixture 10, providing support and protection for the internal components. The base panel 22 forms the bottom of the housing 12, providing a foundation for the light fixture 10. The base panel 22 is perimetrically bounded by FSP 24, SSP 26, and TSP 28, which extend vertically from the base panel 22 to define the interior volume 32. The base panel 22 is important for the stability and mounting of the light fixture 10.

FSP 24, SSP 26, and TSP 28 are side panels that extend from the base panel 22, forming the walls of the housing 12. FSP 24 is positioned at the front, SSP 26 at the side, and TSP 28 at the rear of the housing 12. These panels collectively enclose the interior volume 32, providing a secure environment for the internal components. The diffuser lens 14 is secured to the housing 12 and covers the top opening, allowing light to be transmitted from the interior volume 32. The design of the diffuser lens 14 ensures that light is spread evenly, enhancing the light fixture 10's ability to provide broad area illumination. The board 16 is located within the interior volume 32 and carries the solid-state lighting elements. The board is positioned adjacent to the diffuser lens 14, enabling efficient light transmission through the lens.

FIG. 2 shows a solid-state canopy light fixture 10, which includes a diffuser lens 14, a first side panel 24, a second side panel 26, a third side panel 28, a fourth side panel 30, and a top opening 34. The light fixture 10 is designed to provide adjustable lighting settings, enhancing the functionality of the fixture in various environments. The diffuser lens 14 is centrally positioned within the light fixture 10 and is configured to cover the top opening 34. The diffuser lens 14 is responsible for diffusing light emitted from the solid-state lighting elements, promoting even distribution across the intended area. The diffuser lens 14 is designed to be translucent, allowing light to pass through while minimizing glare and improving illumination quality.

The first side panel 24, referred to as FSP 24, forms part of the structural framework of the light fixture 10. Positioned at the front of the housing 12, FSP 24 provides support and protection for the internal components. FSP 24 contributes to the stability and mounting of the light fixture 10, ensuring that the fixture remains securely in place during operation. The second side panel 26, referred to as SSP 26, is located adjacent to FSP 24 and contributes to the enclosure of the interior volume 32 of the light fixture 10. SSP 26, along with the other side panels 24, 28, and 30, helps define the boundaries of the housing 12, creating a secure environment for the internal components. The placement of SSP 26 plays a significant role in maintaining the structural integrity of the fixture. The third side panel 28, referred to as TSP 28, is positioned opposite SSP 26 and works in conjunction with the other side panels 24 and 30 to enclose the interior volume 32 of the light fixture 10. TSP 28 plays a significant role in providing a protective barrier against external elements, contributing to the longevity and reliability of the fixture in various environmental conditions. The fourth side panel 30, referred to as FSP 30, completes the enclosure of the light fixture 10, forming the rear boundary of the housing 12. FSP 30 plays a significant role in maintaining the overall structure and stability of the fixture, providing a secure framework for the diffuser lens 14 and other internal components.

The top opening 34 is defined by the arrangement of the side panels 24, 26, and 28 and serves as the access point to the interior volume of the light fixture 10. This opening allows for the installation and maintenance of the solid-state lighting elements and other components within the fixture. The top opening 34 is designed to accommodate the diffuser lens 14, ensuring a seamless fit and optimal light diffusion.

FIG. 3 shows a side view of the solid-state canopy light fixture 10, which includes a housing 12, a diffuser lens 14, and a back-up battery 20. The light fixture 10 is designed to provide adjustable lighting settings, enhancing the functionality of the fixture in various environments. The housing 12 serves as the structural framework for the light fixture 10, providing support and protection for the internal components. The housing is box-shaped and comprises a base panel and side panels that collectively define the interior volume, which is accessible through a top opening. The housing 12 plays a significant role in the stability and mounting of the light fixture 10, ensuring that the fixture remains securely in place during operation.

The diffuser lens 14 is secured to the housing 12 and covers the top opening, allowing light to be transmitted from the interior volume. The design of the diffuser lens 14 ensures that light is spread evenly, enhancing the light fixture 10's ability to provide broad area illumination. The back-up battery 20 is positioned within the light fixture 10 to provide power backup capabilities. This component ensures that the light fixture 10 can continue to operate during power outages, maintaining illumination and safety in environments where consistent lighting is important. The back-up battery 20 is a significant feature for applications where uninterrupted lighting is necessary, contributing to the reliability and functionality of the light fixture 10.

FIG. 4 shows a solid-state canopy light fixture 10, which includes a diffuser lens 14 and a back-up battery 20. The light fixture 10 is designed to provide adjustable lighting settings, enhancing the functionality of the fixture in various environments. The diffuser lens 14 is centrally positioned within the light fixture 10 and is configured to cover the top opening, allowing light to be transmitted from the interior volume. The back-up battery 20 is integrated into the light fixture 10 to ensure continued operation during power outages, maintaining illumination and safety in environments where consistent lighting is important. The diffuser lens 14 is important for achieving the desired lighting effects by promoting even distribution across the intended area. The lens is designed to be translucent, allowing light to pass through while minimizing glare and improving illumination quality. The diffuser lens 14 diffuses light emitted from the solid-state lighting elements, promoting even distribution across the intended area. This design ensures that light is spread evenly, enhancing the light fixture 10's ability to provide broad area illumination. The back-up battery 20 is positioned within the light fixture 10 to provide power backup capabilities. This component ensures that the light fixture 10 can continue to operate during power outages, maintaining illumination and safety in environments where consistent lighting is important. The back-up battery 20 is a significant feature for applications where uninterrupted lighting is necessary, contributing to the reliability and functionality of the light fixture 10.

Figure 5:
FIG. 5 is a side view diagram illustrating the diffuser lens configuration in the solid-state canopy light fixture.

FIG. 5 shows a side view diagram illustrating the diffuser lens 14 configuration in the solid-state canopy light fixture 10. The diffuser lens 14 is designed to cover the top opening of the housing 12, ensuring optimal light diffusion and distribution across the intended area. The diffuser lens 14 is designed to be translucent, allowing light to pass through while minimizing glare and improving illumination quality. The lens includes a series of concentric ribs that protrude outwardly, which play a role in diffracting transmitted light to achieve distinct beam angles. This design allows for the adjustment of light patterns without requiring physical modifications to the light fixture 10, thereby improving the versatility and functionality of the light fixture in various environments.

FIG. 6 shows a top view of the diffuser lens 14, which is a component of the solid-state canopy light fixture. The diffuser lens 14 is designed to cover the top opening of the housing, ensuring optimal light diffusion and distribution across the intended area. The diffuser lens 14 includes an outer perimeter 15, which is generally matched to the shape of the top opening, providing a seamless fit and enhancing the fixture's ability to provide broad area illumination. The diffuser lens 14 features a series of concentric ribs, including the first rib 40, second rib 42, and third rib 44. These ribs protrude outwardly from the inner surface of the lens 14, playing a significant role in diffracting transmitted light to achieve distinct beam angles. The first rib 40 is located on the outermost part of the diffuser lens 14, providing a wide beam angle for light transmission. The design of the first rib 40 aligns with the first set of solid-state lighting elements, ensuring efficient light distribution. The second rib 42 is positioned inside the first rib 40 and is configured to diffract light at a different beam angle compared to the first rib 40. The second rib 42 is narrower than the first rib 40, allowing for a more focused light beam. This rib is aligned with the second set of solid-state lighting elements, facilitating precise control over the light pattern. The third rib 44 is the innermost rib on the diffuser lens 14, offering the narrowest beam angle among the three ribs. The third rib 44 is designed to align with the third set of solid-state lighting elements, enabling the fixture to provide targeted illumination. The width of the third rib 44 is greater than that of the second rib 42, allowing for distinct light diffraction properties.

FIG. 7 shows a schematic diagram illustrating the arrangement of solid-state lighting elements (SSLE) 50, 52, and 54, and their alignment with the diffractive ribs in the light fixture. The figure includes a board 16, a diffuser lens 14, a first rib 40, a second rib 42, a third rib 44, and a reflector 70. The board 16 provides support for the solid-state lighting elements 50, 52, and 54. The board 16 is positioned within the light fixture 10 to facilitate the alignment of the SSLE 50, 52, and 54 with the corresponding ribs 40, 42, and 44 on the diffuser lens 14. The board 16 is designed to ensure efficient light transmission and distribution through the diffuser lens 14.

The solid-state lighting elements (SSLE) 50 are arranged along the outermost path on the board 16, aligning with the first rib 40 on the diffuser lens 14. This alignment allows the SSLE 50 to project light through the first rib 40, which is designed to provide a wide beam angle for light distribution. The solid-state lighting elements (SSLE) 52 are positioned along the middle path on the board 16, corresponding to the second rib 42 on the diffuser lens 14. The second rib 42 is narrower than the first rib 40, allowing the SSLE 52 to produce a more focused light beam, enhancing the fixture's ability to provide targeted illumination. The solid-state lighting elements (SSLE) 54 are located along the innermost path on the board 16, aligning with the third rib 44 on the diffuser lens 14. The third rib 44 is designed to offer the narrowest beam angle, enabling the SSLE 54 to deliver precise and concentrated lighting.

The diffuser lens 14 functions as a component that covers the top opening of the housing, ensuring optimal light diffusion and distribution. The lens includes the first rib 40, second rib 42, and third rib 44, which protrude outwardly to diffract transmitted light and achieve distinct beam angles. The design of the diffuser lens 14 allows for the adjustment of light patterns without requiring physical modifications to the light fixture 10. Additionally, the solid-state lighting elements 50, 52, and 54 are mounted on the board 16, enhancing the overall lighting performance of the assembly. The reflector 70 further aids in directing the light emitted from the solid-state lighting elements 50, 52, and 54 for improved illumination. The reflector 70 is situated on the board 16, surrounding each of the solid-state lighting elements 50, 52, and 54. The reflector is designed to direct light toward the diffuser lens 14, enhancing the efficiency of light transmission and improving the overall illumination quality of the fixture. The reflector 70 may be formed from materials such as polyethylene terephthalate to optimize the reflective properties.

What is claimed is:

1. A solid-state canopy light fixture comprising:

a box-shaped housing including a base panel, and a plurality of side panels extending from the base panel and arranged to peripherally define an interior cavity and a top opening;

a diffuser lens configured to cover the top opening of the housing, the diffuser lens comprising a plurality of concentric, diffractive ribs projecting outwardly from an inner lens surface, each of the diffractive ribs having a predetermined rib width, with at least one of the diffractive ribs having a rib width smaller than a rib width of an immediately adjacent diffractive rib, such that the at least one of the diffractive ribs diffracts transmitted light at a beam angle distinct from a beam angle of light transmitted by the immediately adjacent diffractive rib;

a circuit board positioned within the interior cavity near the diffuser lens and carrying multiple discrete groups of solid-state lighting elements, with each group aligned with a corresponding diffractive rib;

a reflective member formed on the circuit board and arranged to surround the solid-state lighting elements so as to direct light toward the diffuser lens; and an electronic control module electrically connected to the circuit board and configured to independently activate each group of solid-state lighting elements to adjust both light beam angles and correlated color temperatures.

2. The solid-state canopy light fixture of claim 1, wherein the electronic control module is configured to store one or more preset lighting modes corresponding to distinct light beam angles and correlated color temperatures.

3. The solid-state canopy light fixture of claim 1, wherein the reflective member is formed from polyethylene terephthalate.

4. The solid-state canopy light fixture of claim 1, wherein the plurality of diffractive ribs are arranged concentrically about a central axis of the diffuser lens.

5. The solid-state canopy light fixture of claim 1, wherein each discrete group of solid-state lighting elements comprises light emitting diodes.

6. The solid-state canopy light fixture of claim 1, wherein the electronic control module is further configured to independently control the intensity of each discrete group of solid-state lighting elements.

7. The solid-state canopy light fixture of claim 1, wherein the rib width of the at least one of the diffractive ribs is narrower than the rib width of the immediately adjacent rib by a predetermined ratio.

8. The solid-state canopy light fixture of claim 1, wherein the circuit board comprises a printed circuit board having conductive traces electrically connecting the discrete groups of solid-state lighting elements to the electronic control module.

9. The solid-state canopy light fixture of claim 1, wherein the housing is formed of a polymeric material selected from the group consisting of plastic and composite materials.

10. The solid-state canopy light fixture of claim 1, wherein the diffuser lens has an outer perimeter generally matched to a shape of the top opening.

* * * * *